· US010297085B2

United States Patent
Anderson

(10) Patent No.: US 10,297,085 B2
(45) Date of Patent: May 21, 2019

(54) AUGMENTED REALITY CREATIONS WITH INTERACTIVE BEHAVIOR AND MODALITY ASSIGNMENTS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 15/278,662

(22) Filed: Sep. 28, 2016

(65) Prior Publication Data
US 2018/0089895 A1    Mar. 29, 2018

(51) Int. Cl.
| | |
|---|---|
| *G06T 19/00* | (2011.01) |
| *G06T 19/20* | (2011.01) |
| *A63F 13/00* | (2014.01) |
| *G06F 3/00* | (2006.01) |
| *G06F 3/01* | (2006.01) |
| *G06F 3/03* | (2006.01) |
| *G06K 9/00* | (2006.01) |
| *G06K 9/20* | (2006.01) |
| *G06T 7/50* | (2017.01) |
| *G06T 7/10* | (2017.01) |
| *A63F 13/25* | (2014.01) |
| *A63F 13/213* | (2014.01) |

(52) U.S. Cl.
CPC .......... *G06T 19/006* (2013.01); *A63F 13/00* (2013.01); *A63F 13/213* (2014.09); *A63F 13/25* (2014.09); *G06F 3/00* (2013.01); *G06F 3/011* (2013.01); *G06F 3/0304* (2013.01); *G06K 9/00671* (2013.01); *G06K 9/00805* (2013.01); *G06K 9/2081* (2013.01); *G06T 7/10* (2017.01); *G06T 7/50* (2017.01); *G06T 19/20* (2013.01)

(58) Field of Classification Search
CPC ..................................................... G06T 19/006
See application file for complete search history.

(56) References Cited

U.S. PATENT DOCUMENTS

| | | | |
|---|---|---|---|
| 8,717,318 B2 | 5/2014 | Anderson et al. | |
| 8,736,583 B2 | 5/2014 | Anderson et al. | |
| 8,913,085 B2 | 12/2014 | Anderson | |
| 8,977,972 B2 | 3/2015 | Anderson | |
| 9,152,306 B2 | 10/2015 | Anderson | |
| 9,264,515 B2 | 2/2016 | Ganapathy et al. | |
| 9,330,478 B2 | 5/2016 | Anderson | |
| 9,389,779 B2 | 7/2016 | Anderson | |
| 2008/0036776 A1* | 2/2008 | Niles ................... | G06F 3/04815 345/474 |

(Continued)

FOREIGN PATENT DOCUMENTS

| | | |
|---|---|---|
| CN | 201380078798.5 | 12/2012 |
| WO | 2013/077883 A1 | 5/2013 |

(Continued)

*Primary Examiner* — Phi Hoang
(74) *Attorney, Agent, or Firm* — Jordan IP Law, LLC

(57) ABSTRACT

Systems, apparatuses and methods of creating virtual objects may provide for segmenting one or more objects in a scene and highlighting a selected object from the segmented one or more objects based on an input from a user. In one example, a scene-based virtual object is created from the selected object and a behavior is assigned to the scene-based virtual object.

20 Claims, 9 Drawing Sheets

(56) References Cited

U.S. PATENT DOCUMENTS

| | | |
|---|---|---|
| 2011/0205148 A1 | 8/2011 | Corriveau et al. |
| 2011/0276894 A1 | 11/2011 | Younkin et al. |
| 2014/0092005 A1 | 4/2014 | Anderson |
| 2014/0292807 A1 | 10/2014 | Raffa et al. |
| 2015/0074545 A1 | 3/2015 | Anderson |
| 2015/0187108 A1* | 7/2015 | Mullins ................ G06T 19/006 345/633 |
| 2015/0235432 A1* | 8/2015 | Bronder ............... G06T 19/006 345/633 |
| 2016/0088268 A1 | 3/2016 | Durham et al. |
| 2016/0091964 A1 | 3/2016 | Iyer et al. |
| 2016/0171767 A1 | 6/2016 | Anderson |
| 2016/0188585 A1 | 6/2016 | Durham et al. |
| 2016/0217623 A1* | 7/2016 | Singh .................... G09G 3/003 |
| 2016/0247320 A1 | 8/2016 | Yuen et al. |
| 2017/0329488 A1* | 11/2017 | Welker ................. G06F 3/0304 |
| 2018/0001183 A1* | 1/2018 | Tran ...................... A63B 69/38 |
| 2018/0075658 A1* | 3/2018 | Lanier .................. G06T 19/006 |

FOREIGN PATENT DOCUMENTS

| | | |
|---|---|---|
| WO | 2013/095383 | 6/2013 |
| WO | 2013/095400 | 6/2013 |
| WO | 2013095393 A1 | 6/2013 |
| WO | 2015/072968 | 5/2015 |
| WO | 2015/084349 | 6/2015 |
| WO | 2015/094222 | 6/2016 |

* cited by examiner

AUGMENTED REALITY CREATIONS WITH INTERACTIVE BEHAVIOR AND MODALITY ASSIGNMENTS

TECHNICAL FIELD

Embodiments generally relate to augmented reality systems. More particularly, embodiments relate to augmented reality creations with interactive behavior and modality assignments.

BACKGROUND

United States Patent Publication No. 2016/0091964, entitled "SYSTEMS, APPARATUSES, AND METHODS FOR GESTURE RECOGNITION AND INTERACTION," generally discusses systems and apparatuses for gesture-based augmented reality. According to an example a method may include detecting, in image data, an object and a gesture, in response to detecting the object in the image data, providing data indicative of the detected object, in response to detecting the gesture in the image data, providing data indicative of the detected gesture, and modifying the image data using the data indicative of the detected object and the data indicative of the detected gesture.

U.S. Pat. No. 9,330,478, entitled "AUGMENTED REALITY CREATION USING A REAL SCENE," generally discusses creation of augmented reality using a real scene. In one example, a process includes observing a real scene through a camera of a device, observing a user gesture through the camera of the device, presenting the scene and the gesture on the display of the device, generating a virtual object and placing it in the scene based on the observed user gesture, and presenting the virtual object in the real scene on the display.

U.S. Pat. No. 8,977,972 entitled "USING MULTI-MODAL INPUT TO CONTROL MULTIPLE OBJECTS ON A DISPLAY," generally discusses systems, methods, and machine-readable mediums for implementing gesture-based signature authentication. In one embodiment, a system may include several modal input devices. Each modal input device is capable of retrieving a stream of modal input data from a user. The system also includes modal interpretation logic that can interpret each of the retrieved modal input data streams into a corresponding of set of actions. The system additionally includes modal pairing logic to assign each corresponding set of actions to control one of the displayed objects. Furthermore, the system has modal control logic that causes each displayed object to be controlled by its assigned set of actions.

U.S. Pat. No. 8,913,085 entitled "OBJECT MAPPING TECHNIQUES FOR MOBILE AUGMENTED REALITY APPLICATIONS," generally discusses techniques that involve mobile augmented reality (MAR) applications in which users (e.g., players) may experience augmented reality (e.g., altered video or audio based on a real environment). For example, particular objects may be altered to appear differently. Such alterations may be based on stored profiles and/or user selections. For example, in embodiments, characters and/or other objects may be sent (or caused to appear) to other users in other locations. Also, a user may leave a character at another location and receive an alert when another user/player encounters this character. Also, characteristics of output audio may be affected based on events of the MAR application.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
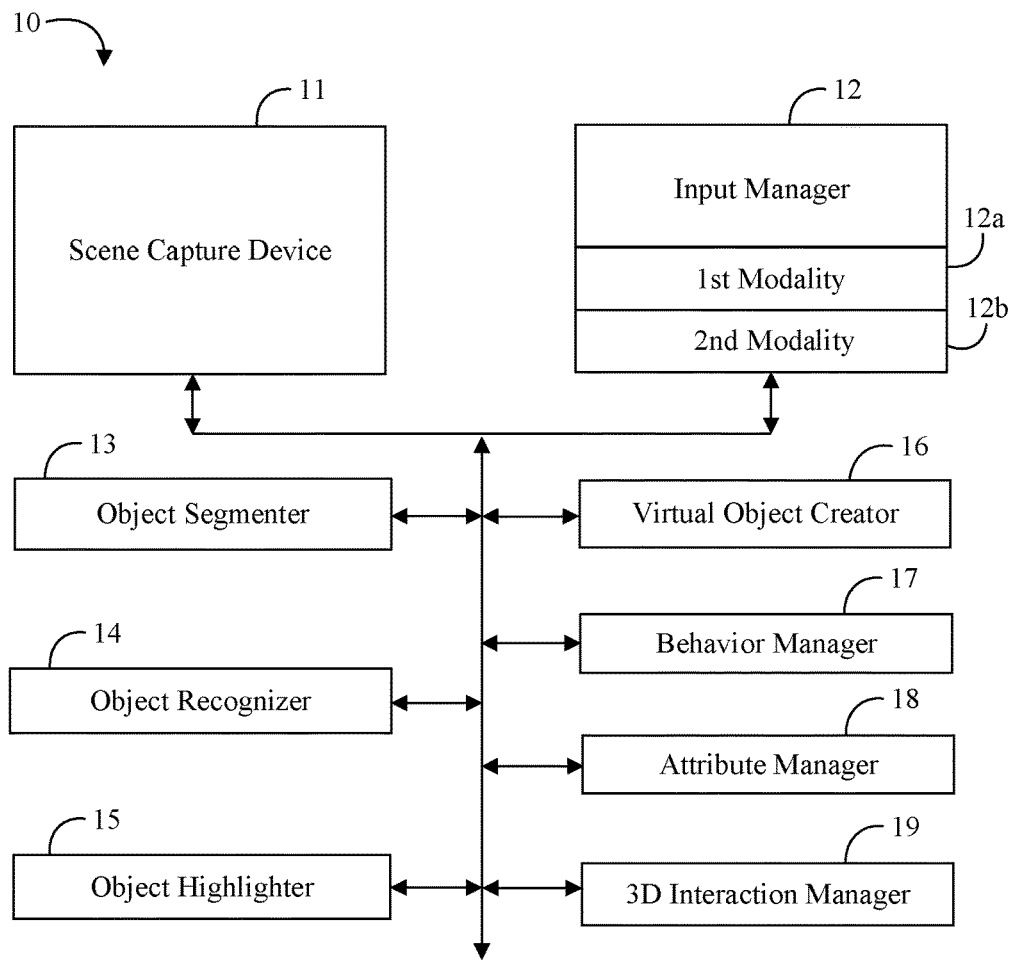
FIG. 1 is a block diagram of an example of an augmented reality system according to an embodiment.

Turning now to FIG. 1, an embodiment of an augmented reality system 10 may include a scene capture device 11 to capture an electronic representation of a scene, an input manager 12 to manage an input from a user, the input manager including at least a first input interface 12a to process a first input modality and a second input interface 12b to process a second input modality different from the first input modality, an object segmenter 13 communicatively coupled to the scene capture device 11 to segment one or more objects in the captured scene, an object recognizer 14 communicatively coupled to the object segmenter 13 to recognize one or more of the segmented objects, an object highlighter 15 communicatively coupled to the object segmenter 13, the object recognizer 14, and the input manager 12 to highlight a selected object, selected from the segmented one or more objects and the one or more recognized objects based on an input from the user, a virtual object creator 16 communicatively coupled to the object highlighter 15 to create a scene-based virtual object from the selected object, and a behavior manager 17 communicatively coupled to the virtual object creator 16 to assign a dynamic behavior to the scene-based virtual object. For example, scene information captured by the scene capture device 11 may include image information including color and depth information.

Advantageously, in some embodiments of the augmented reality system 10 the dynamic behavior may include an interactive behavior between the scene-based virtual object and a second object in the scene. Some embodiments of the augmented reality system 10 may advantageously further include an attribute manager 18 communicatively coupled to the virtual object creator 16 to assign an attribute to the scene-based virtual object and/or a three dimensional (3D) interaction manager 19 to receive depth information from the scene capture device 11 and to manage occlusion effects between the scene-based virtual object and the second object in the scene based on the received depth information. For example, a virtual object may include or correspond to an augment reality (AR) object. For example, the attribute manager 18 may be further to assign attributes to any objects in the scene. The attributes assigned to objects may include, for example, size, color, and shape, among other attributes.

Figure 2:
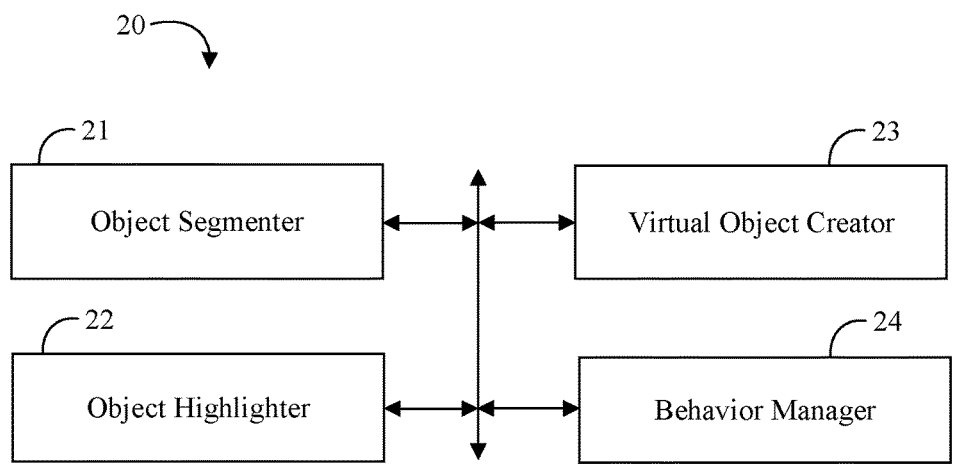
FIG. 2 is a block diagram of an example of a virtual object creation apparatus according to an embodiment.

Turning now to FIG. 2, an embodiment of a virtual object creation apparatus 20 may include an object segmenter 21 to segment one or more objects in a scene, an object highlighter 22 communicatively coupled to the object segmenter 21 to highlight a selected object (e.g., selected from the segmented one or more objects based on an input from a user), a virtual object creator 23 communicatively coupled to the object highlighter 22 to create a scene-based virtual object from the selected object, and a behavior manager 24 communicatively coupled to the virtual object creator to assign a behavior to the scene-based virtual object. For example, the behavior may include a dynamic behavior. For example, the dynamic behavior may include an interactive behavior between the scene-based virtual object and a second object in the scene. Embodiments of the apparatus 20 may optionally further include an attribute manager, a 3D interaction manager, an input manager, and/or an input association manager as described herein.

Figure 3:
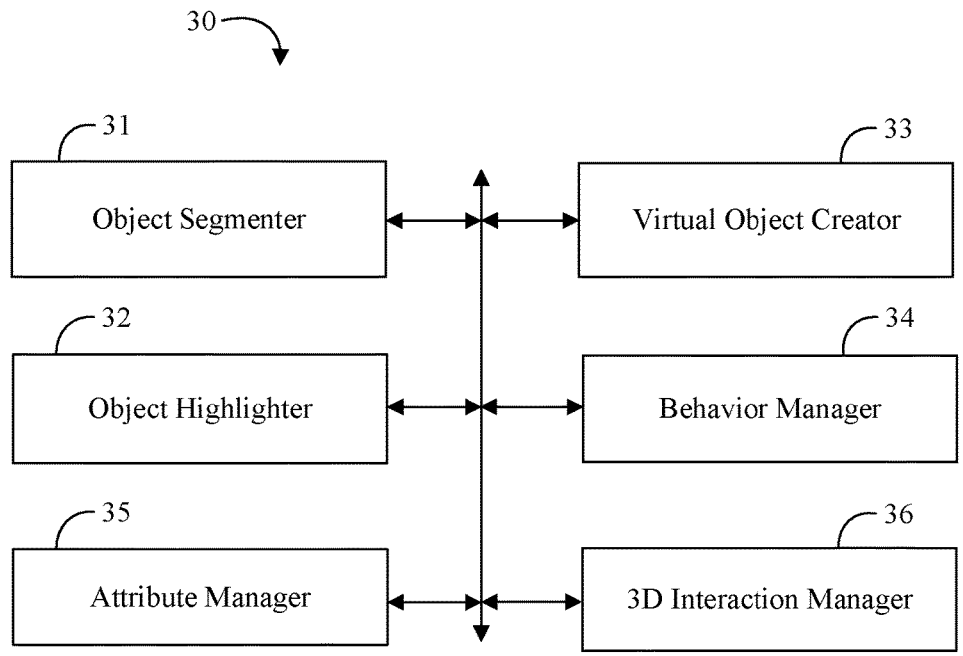
FIG. 3 is a block diagram of an example of another virtual object creation apparatus according to an embodiment.

Turning now to FIG. 3, an embodiment of a virtual object creation apparatus 30 may include an object segmenter 31 to segment one or more objects in a scene, an object highlighter 32 communicatively coupled to the object segmenter 31 to highlight a selected object (e.g., selected from the segmented one or more objects based on an input from a user), a virtual object creator 33 communicatively coupled to the object highlighter 32 to create a scene-based virtual object from the selected object, and a behavior manager 34 communicatively coupled to the virtual object creator to assign a behavior to the scene-based virtual object. For example, the behavior may include a dynamic behavior. For example, the dynamic behavior may include an interactive behavior between the scene-based virtual object and a second object in the scene.

The apparatus 30 may advantageously further include an attribute manager 35 communicatively coupled to the virtual object creator 33 to assign an attribute to the scene-based object. The apparatus 30 may advantageously further include a three dimensional interaction manager 35 to receive depth information related to the scene and to manage occlusion effects between the scene-based virtual object and the second object in the scene based on the received depth information. For example, the second object in the scene may correspond to either a second segmented object in the scene or a second virtual object added to the scene by the user. Embodiments of the apparatus 30 may optionally further include an input manager and/or an input association manager as described herein.

Figure 4:
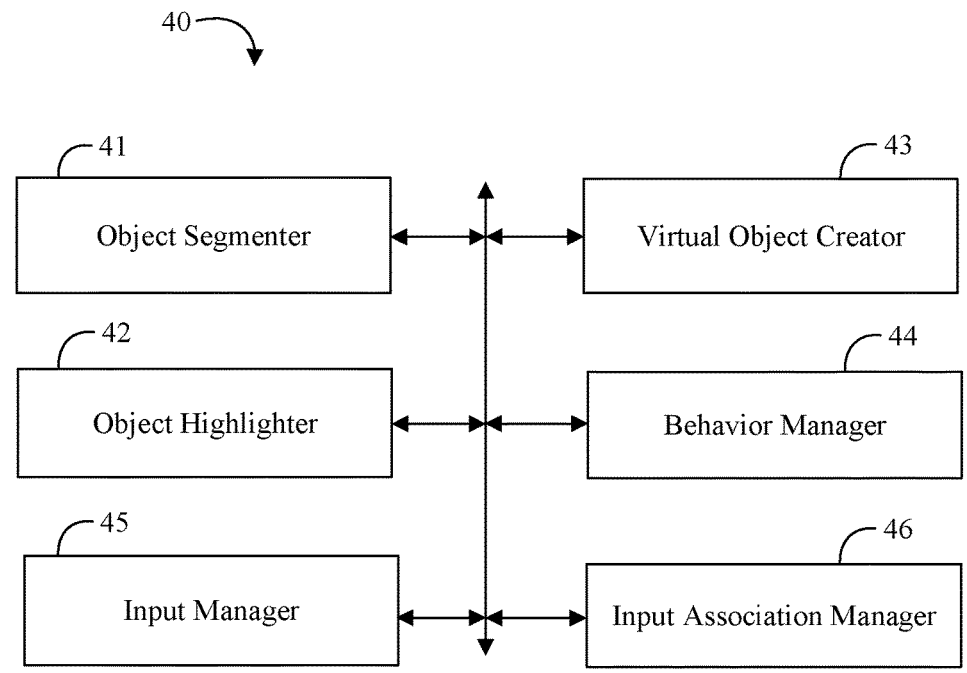
FIG. 4 is a block diagram of an example of another virtual object creation apparatus according to an embodiment.

Turning now to FIG. 4, an embodiment of a virtual object creation apparatus 40 may include an object segmenter 41 to segment one or more objects in a scene, an object highlighter 42 communicatively coupled to the object segmenter 41 to highlight a selected object (e.g., selected from the segmented one or more objects based on an input from a user), a virtual object creator 43 communicatively coupled to the object highlighter 42 to create a scene-based virtual object from the selected object, and a behavior manager 44 communicatively coupled to the virtual object creator to assign a behavior to the scene-based virtual object. For example, the behavior may include a dynamic behavior. For example, the dynamic behavior may include an interactive behavior between the scene-based virtual object and a second object in the scene. The apparatus 40 may advantageously further include an input manager 45 to manage an input from the user (e.g., the input manager including at least a first input interface to process a first input modality and a second input interface to process a second input modality different from the first input modality), and an input association manager 46 to associate the first input modality with the scene-based virtual object and to associate the second input modality with the second object. In some embodiments of the apparatus 40, the input association manager 46 may be further to manage an association between an input modality and groups of objects in the scene. The apparatus 40 may optionally further include a 3D interaction manager as described herein.

Each of the components described herein may be implemented in hardware, in software, or in some combination thereof. For example, each of the above input manager, object segmenter, object recognizer, object highlighter, virtual object creator, behavior manager, 3D interaction manager, input association manager, and other components described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 5A:
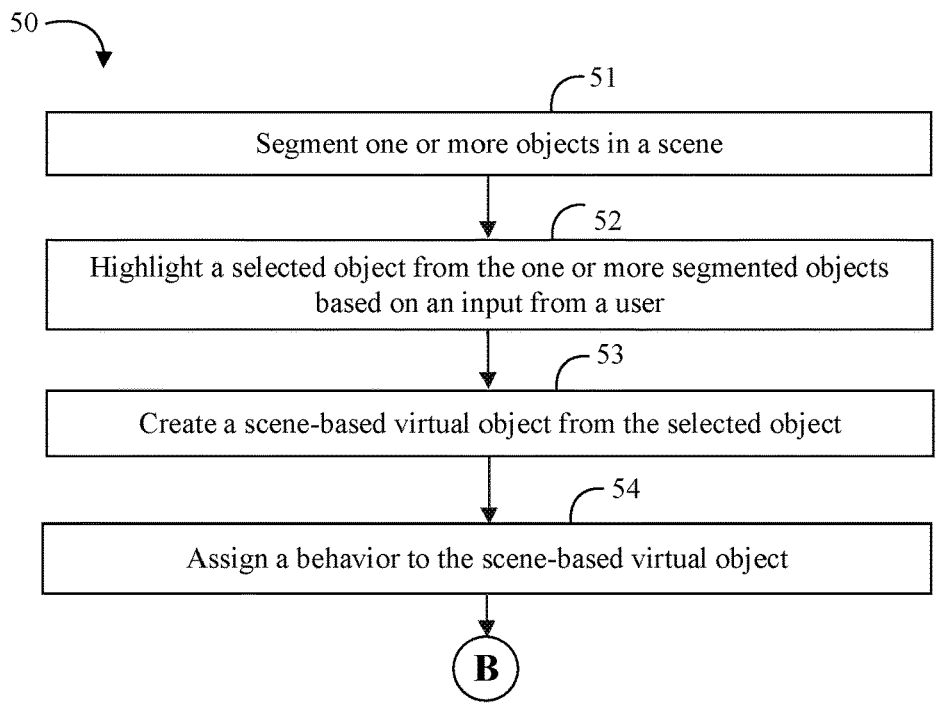
FIGS. 5A to 5C are flowcharts of an example of a method of creating a virtual object according to an embodiment.
Figure 5B:
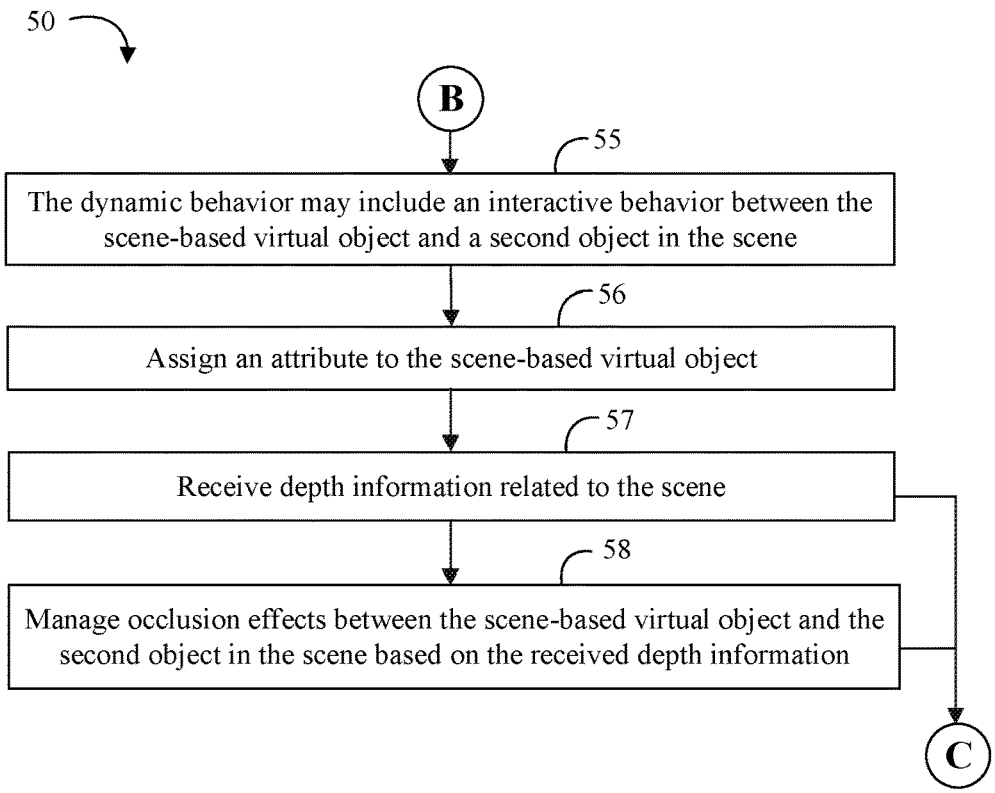
Figure 5C:
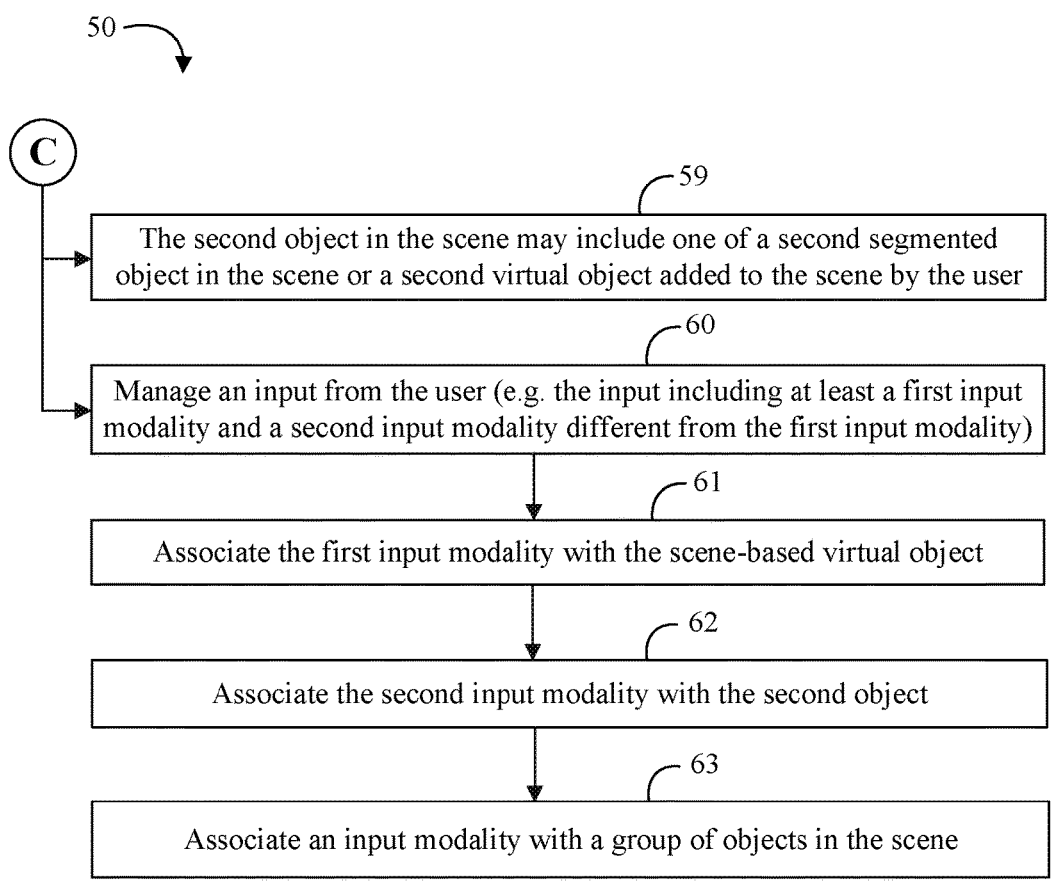

Turning now to FIGS. 5A to 5C, a method 50 of creating a virtual object may include segmenting one or more objects in a scene at a block 51, highlighting a selected object from the segmented one or more objects based on an input from a user at block 52, creating a scene-based virtual object from the selected object at block 53, and assigning a behavior to the scene-based virtual object at block 54. For example, the behavior may include a dynamic behavior. For example, the dynamic behavior may advantageously include an interactive behavior between the scene-based virtual object and a second object in the scene at block 55. Some embodiments of the method 50 may advantageously further include assigning an attribute to the scene-based virtual object at block 56. Some embodiments of the method 50 may advantageously further include receiving depth information related to the scene at block 57, and managing occlusion effects between the scene-based virtual object and the second object in the scene based on the received depth information at block 58.

In some embodiments of the method 50, the second object in the scene may include one of a second segmented object in the scene or a second virtual object added to the scene by the user at block 59. For example, some embodiments of the method 50 may advantageously further include managing an input from the user (e.g., the input including at least a first input modality and a second input modality different from the first input modality) at block 60, associating the first input modality with the scene-based virtual object at block 61, and associating the second input modality with the second object at block 62. Some embodiments of the method 50 may further include associating an input modality with a group of objects in the scene at block 63. None-limiting examples of input modalities include, touch, voice, gesture, gesture from one limb versus another, and eye tracking.

The method 50 may generally be implemented in a system such as, for example, the augmented reality system 10 (see FIG. 1), or an apparatus such as, for example, the virtual object creation apparatus 20, 30, or 40 (see FIGS. 2 to 4), already discussed. More particularly, the method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. For example, computer program code to carry out operations shown in method 50 may be written in any combination of one or more operating system applicable/appropriate programming languages, including an object oriented programming language such as JAVA, SMALLTALK, C++ or the like and conventional procedural programming languages, such as the "C" programming language or similar programming languages.

For example, an embodiment may include at least one computer readable storage medium comprising a set of instructions, which when executed by a computing device, cause the computing device to segment one or more objects in a scene, highlight a selected object from the segmented one or more objects based on an input from a user, create a scene-based virtual object from the selected object, and assign a behavior to the scene-based virtual object. The behavior may include a dynamic behavior. For example, the dynamic behavior may include an interactive behavior between the scene-based virtual object and a second object in the scene. In some embodiments, the at least one computer readable storage medium may include a further set of instructions, which when executed by a computing device, cause the computing device to receive depth information related to the scene, and manage occlusion effects between the scene-based virtual object and the second object in the scene based on the received depth information. For example, the second object in the scene comprises one of a second segmented object in the scene or a second virtual object added to the scene by the user.

Some embodiments of the at least one computer readable storage medium may include a further set of instructions, which when executed by a computing device, cause the computing device to manage an input from the user, the input including at least a first input modality and a second input modality different from the first input modality, associate the first input modality with the scene-based virtual object, and associate the second input modality with the second object. For example, the at least one computer readable storage medium may include a further set of instructions, which when executed by a computing device, cause the computing device to associate an input modality with a group of objects in the scene.

Advantageously, some embodiments may involve interactively assigning attributes and/or behaviors to augmented reality (AR) objects created from an incoming video stream. For example, some embodiments of the at least one computer readable storage medium may include a further set of instructions, which when executed by a computing device, cause the computing device to assign an attribute to the scene-based virtual object. App-based AR elements may interact with the AR objects from the incoming video stream. Some embodiments may include an interaction among identified AR objects, assigning attributes and behaviors and interactions (e.g., among AR objects and between AR objects and real objects). For example, attributes assignable to an AR object may include size, color, properties, and metadata.

Advantageously, embodiments of an augmented reality system may support many virtual objects of different kinds, thereby facilitating many different types of interactions. For example, embodiments of the AR system may enable users to create and manipulate AR objects in new ways. For example, the AR system may automatically recognize objects, delineate them, enable the user to use them to create AR objects, and allow the user to create behavior relationships among the virtual objects created. Profiles for the AR objects may contain these elements. Embodiments of the AR system may allow the user to manipulate delineated objects from a video stream to create AR objects and effects and then make associations among AR objects so that they interact with each other (e.g., one chases another, one changes its appearance if the other one does).

If content is originally captured with depth information and/or from multiple angles, embodiments of the AR system may make more intelligent renderings of the interactions to have the right occlusion of elements (real and virtual) using depth information. Advantageously, in some embodiments of the AR system the user may also control newly created AR objects in different ways, assigning them to gesture, voice, eye tracking, or touch. For example, various AR objects may follow one kind of user input (e.g., voice) while other objects may follow another modality (e.g., gesture). The user may also make modality assignments for groups or types of AR elements, e.g., air gesture to command flying elements, touch for ground elements, different assignments to limbs and hands, and/or an assignment of a group to follow certain gestures or sounds while others do not.

Figure 6:
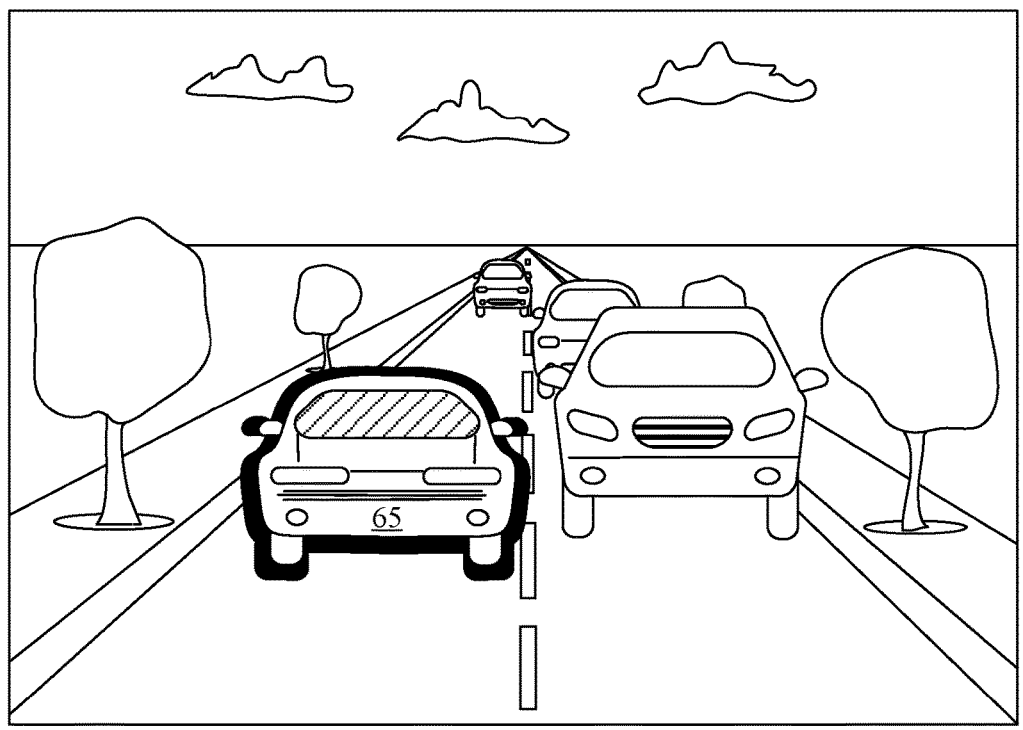
FIG. 6 is an example of an illustrative screen display according to an embodiment.
Figure 7:
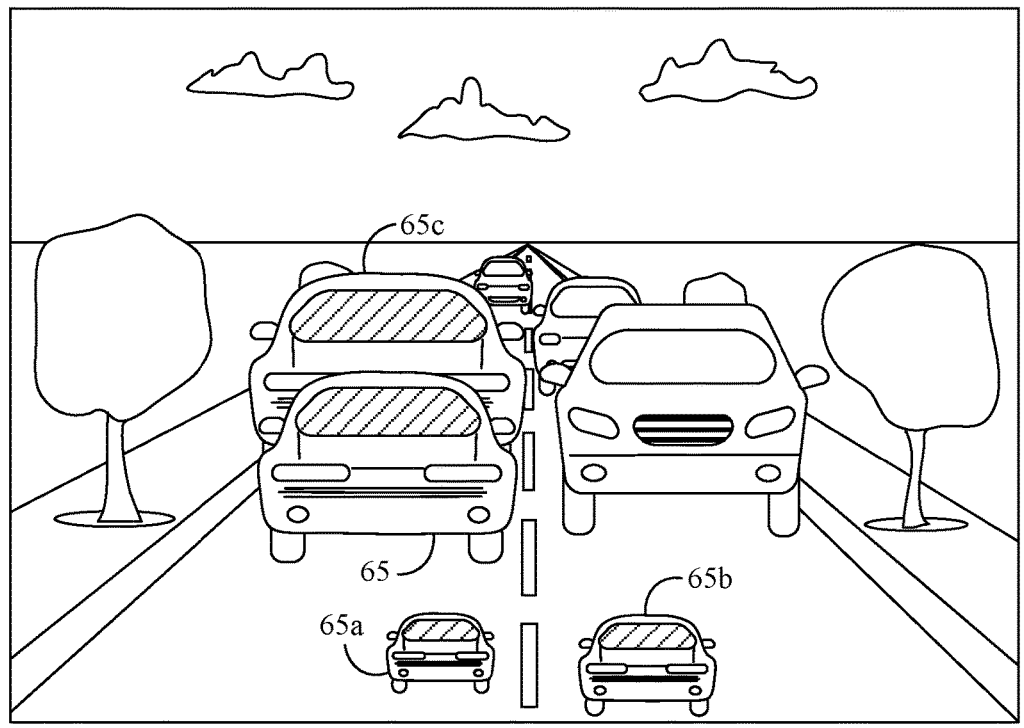
FIG. 7 is an example of another illustrative screen display according to an embodiment.
Figure 8:
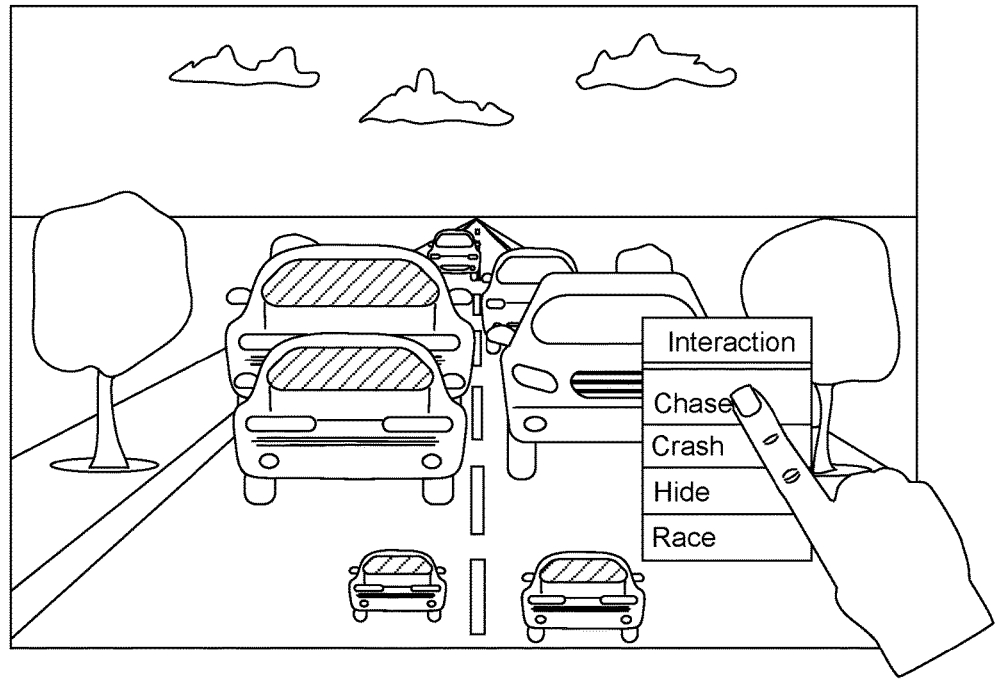
FIG. 8 is an example of another illustrative screen display according to an embodiment.

Turning now to FIGS. 6 to 8, examples of illustrative screen displays show various features and usages according to embodiments of an augmented reality system and methods of operating an augmented reality system. An embodiment of an augmented reality system may highlight a car 65 from a scene (e.g., by segmenting, recognizing, and then outlining or delineating the car on the display in FIG. 6). The user may then create multiple virtual versions of the car 65 in different sizes (e.g., see virtual cars 65*a*, 65*b*, and 65*c* in FIG. 7). Next, the user may specify an interactive behavior (e.g., one car chasing another along a traced path). For example, FIG. 8 shows a user utilizing a touch interface to select a chase option. The touch interface may also be utilized to trace a path for the cars to chase along. Alternatively, one or more of the cars 65*a-c* could follow the path of the car 65 from the scene. After the creation of the virtual objects (e.g., virtual cars 65*a-c*), for example, the virtual objects could continue to respond to user commands while following their assigned interaction commands (e.g., the user could make a voice command to have the car being chased make a puff of smoke). The user may also change attributes of the virtual cars. For example, the car 65*b* may have a relatively smaller size attribute and the car 65*c* may have a relatively larger size attribute. The car 65*b* may have a blue color attribute while the car 65*c* may have a green color attribute. In some embodiments, the rendered augmented scene may be recorded for later playback.

Figure 9:
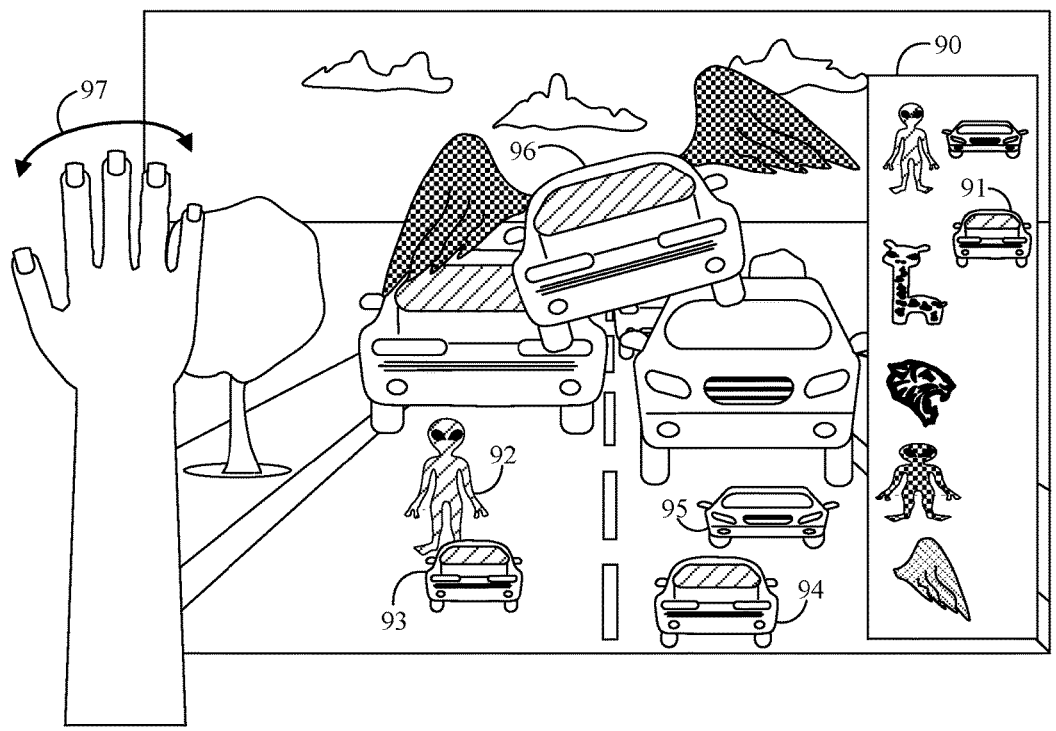
FIG. 9 is an example of another illustrative screen display according to an embodiment.

Turning now to FIG. 9, an example of an illustrative screen display shows an embodiment of a user interface (UI) including additional ways in which virtual objects may be assigned behaviors, interactions, and other attributes. A palette 90 on the right side of the illustrative display may include augmented reality (AR) objects that originate from user captured scene-based content (e.g., like the car 65 from FIG. 6) and from an application or other source (e.g., other virtual objects like a giraffe, a tiger, aliens, wings, other cars, etc.). Objects may be automatically recognized in the user content (e.g., a scene from a video clip) and may be delineated and added to the palette (e.g., like car 91). For example, an object like a car in a scene may be recognized as a vehicle and may automatically inherit certain attributes like vehicle sound effects (e.g., engine noise) and behaviors (e.g., driving around on wheels). Similar palettes or alternative UI features may be displayed or employed to select attributes, behaviors, and/or interactions.

In some embodiments of an augmented reality system, a user may assign AR objects to interact with real objects (e.g., scene-based objects), for example by chasing them. For example, an object tracker may track the real object in the scene and the AR object may follow the dynamic path of the real object. As illustrated, an alien 92 in the lower left corner of the FIG. 9 may be chasing the tiny car 93 (e.g., which may be an AR version of the real car 65 from FIG. 6). A user may also have AR versions of real objects interact with purely virtual objects. For example, in the foreground of FIG. 9, the user may have chosen to have another AR version 94 of the real car race a virtual car 95. Another example is adding a wing object to a car 96 and having the car 96 appear to fly around the scene according to a gesture input 97 from the user.

Figure 10:
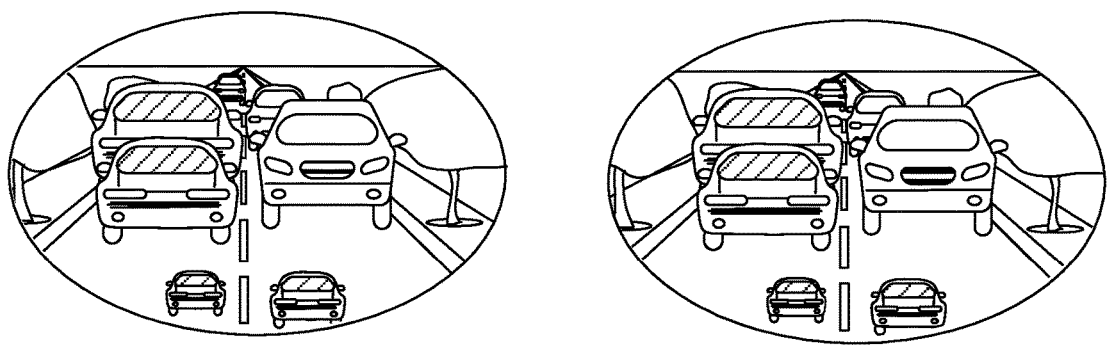
FIG. 10 is an example of another illustrative screen display according to an embodiment.

Turning now to FIG. 10, an example of an illustrative screen display shows an embodiment of an augmented reality system including a transparent wearable display. For example, the system may include a head-mounted display (HMD) system that monitors other modalities of input. For example, dual images may be utilized in a virtual reality headset.

In some embodiments, approximated depth information for objects in the video allows virtual occlusion of the AR element to allow more realism. For example, when one AR object follows another, the AR objects could go in front of and behind non-altered elements of the video. In the example above, the AR cars could go behind others and hide from each other. Advantageously, delineated object outlines may be utilized as occlusion layer masks. For example, in FIG. 7 the outline of the real car 65 may be utilized as a layer mask for the virtual car 65c (e.g., making the real car 65 appear to be in front of the virtual car 65c), and the outline of the virtual car 65c may be utilized as a layer mask for the scene elements behind the virtual car 65c.

Advantageously, some embodiments of an augmented reality system may allow users to create behavioral relationships among AR elements that are created from a video stream or a still image. Also, embodiments are not limited to gesture input and wearable displays, rather the user may direct the AR elements in various modalities and the AR scene may be rendered on various types of display devices.

Advantageously, according to some embodiments a wide variety of interactive behaviors may be defined among AR objects. In some embodiments, for example, one object may follow another, objects may engage in prescribed behaviors (e.g., which a user may enter in various interfaces; for example, one object gets a prescribed path or types of movements, and another object follows), one group of objects may be assigned to a particular voice commend or gesture, one object may be the leader of a group and other objects may follow in formation (the leader may follow, for example, the user's eye movements to determine where to go), the user may select an object for others to swarm, objects may change color automatically in response to the user changing the color of another object, objects may make noise or vibration outputs in response to each other or non-altered objects (non-altered objects may refer to objects in the video stream that may be recognized but are not altered by the user), a newly created object may be directed to move around a non-altered object in the video, and/or the user may choose an object from a still image and direct it to multiply and move around on the still image to create a video effect on the still image.

Figure 11:
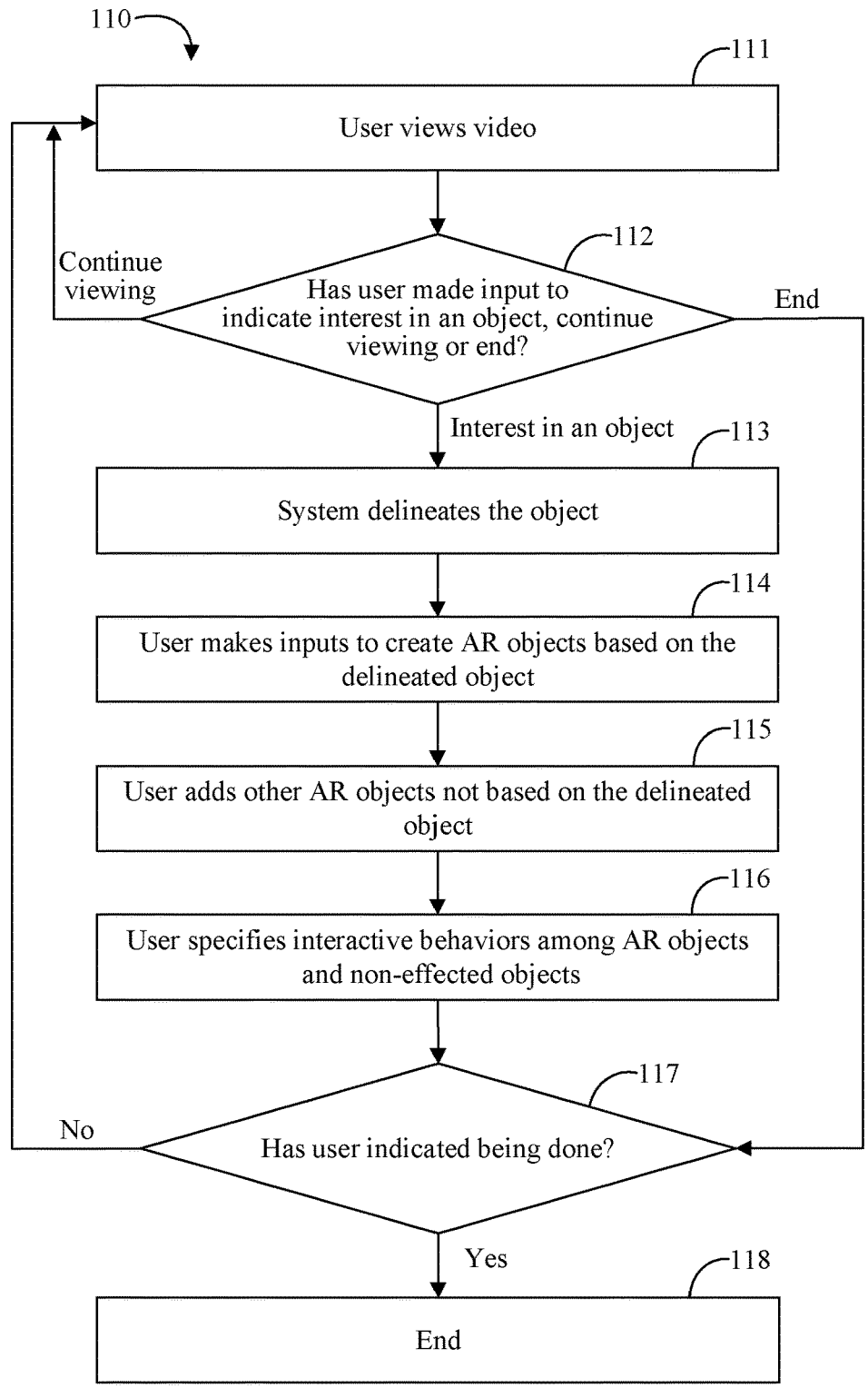
FIG. 11 is a flowchart of an example of a method of operating an augmented reality system according to an embodiment.

Turning now to FIG. 11, a method 110 of operating an augmented reality system may include a user viewing a video at block 111, and determining at block 112 if the user has made an input to indicate 1) an interest in an object from the video; 2) whether to continue viewing the video; or 3) whether to end. For example, indications of user interactions may include, but may not be limited to, a gesture, a change of a user's facial expression, a verbal command issued by a user, a change in the user's eye gaze, a change of the user's posture, a change of the user's head pose, or a combination thereof.

In some embodiments, the determining at block 112 may further include tracking a plurality of sensors to track indications of user interactions. The sensors may include proximity sensors, inertial sensors, optical sensors, light sensors, audio sensors, temperature sensors, thermistors, motion sensors, vibration sensors, microphones, cameras, and/or other types of sensors. The sensors may be distributed in a number of different ways. For example, some sensors (e.g., a microphone to capture audio associated with a user voice command) may reside in the scene capture device (e.g., a camera). Some sensors, such as motion sensors (e.g., accelerometers, gyroscopes, and the like) may be placed in or around a hand held device such as a smartphone held by the user.

The method 110 returns to block 111 if the user input at block 112 indicates to continue viewing the video, and the method 110 moves to block 117 (hereafter described) if the user input at block 112 indicates to end. If the user input at block 112 indicates an interest in an object, then the method 110 further includes delineating the object at block 113, creating an AR object based on the delineated object and input from the user at block 114, optionally adding other AR objects not based on the delineated object at block 115, and specifying interactive behaviors among the AR objects (e.g., including the AR object based on the delineated objects) and/or non-effected objects at block 116. If the user indicates being done at block 117, the method 110 ends at block 118. If the user does not indicate being done at block 117, the method 110 returns to block 111.

Figure 12:
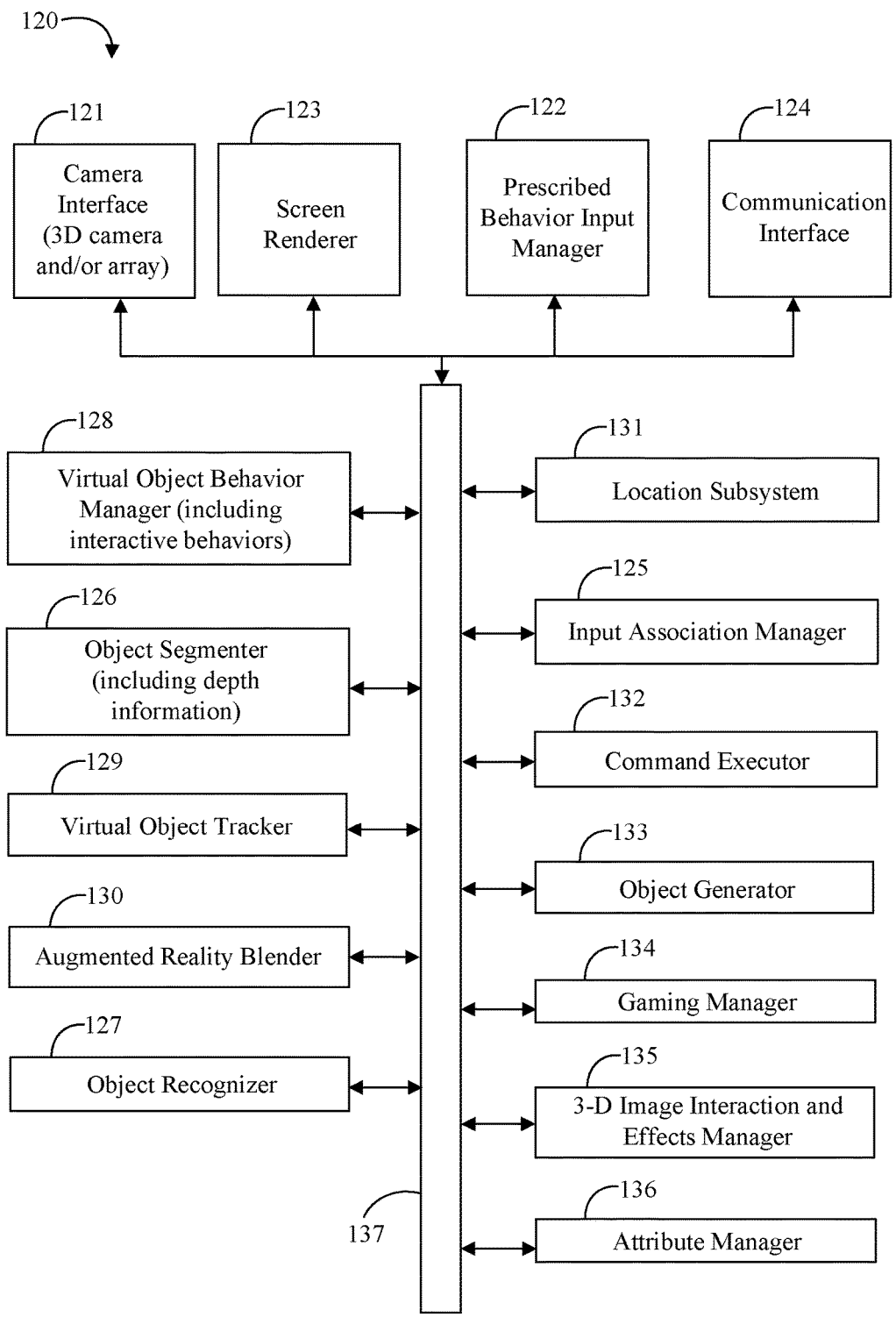
FIG. 12 is a block diagram of an example of another augmented reality system according to an embodiment.

Turning now to FIG. 12, an embodiment of an augmented reality system 120 may include an input/output section including a camera interface 121 (e.g., including a 3D camera and/or camera array) and a prescribed behavior input manager 122 (e.g., including a plurality of input interfaces such as, for example, a gesture recognition interface, a touch interface, a voice interface, a facial expression interface, and an eye tracking interface). The input/output section may further include a screen renderer 123 and a communication interface 124. A processing section of the augmented reality system 120 may include an input association manager 125, an object segmenter 126, an object recognizer 127, a virtual object behavior manager 128, a virtual object tracker 129, an augmented reality blender 130, a local subsystem 131, a command executor 132, an object generator 133, a gaming manager 134, a 3D interaction and effects manager 135, and an attribute manager 136. Each of the foregoing components and interfaces may be communicatively coupled to each other as needed either directly or by a bus or set of busses 137.

The camera interface 121 may include cameras or interfaces to cameras that may be peripherally attached or integrated into the system 120. The cameras may be communicatively coupled with the camera interface 121 via a wired or wireless connection suitable for transmitting data captured by cameras. The cameras may include a 3D camera or camera array to capture both depth and color information. For example, in some embodiments, the cameras may incorporate a depth sensor, such as, an infrared emitter utilized in combination with an infrared camera, as well as a two-dimensional (2D) image capture sensor, such as a red, green, and blue (RGB) camera sensor. Generally, the cameras may have 2D or three-dimensional (3D) image capture capabilities and may be embodied as a 3D camera, depth camera, or bifocal camera, and/or be otherwise capable of generating a depth image, channel, or stream. The cameras may include a still camera, a video camera, a webcam, an infrared (IR) camera, or other device or devices capable of capturing video and/or images.

The prescribed behavior input manager 122 may support many types of input interfaces. For example, the prescribed behavior input manager 122 may include a standard touch screen interface for an app in which the user makes touch gestures to lay out paths for interactions. The prescribed behavior input manager 122 may also include interfaces for textual descriptions, air gestures, voice input, choices of shapes to adjust movements, and/or a color palette to change colors of objects all at once or over a series of frames that animate the change. Advantageously, such interfaces may be applied to directing the interactions of AR elements.

The prescribed behavior input manager 122 may also include a gesture recognizer to recognize and track hand and arm gestures of a user. The gesture recognizer may be used to recognize hands, fingers, finger gestures, hand movements and a location of hands relative to displays. For example, the gesture recognizer may determine that a user made a body part gesture to drop or throw a virtual object onto the real scene, or that the user made a body part gesture to move the virtual object from one location or another. The gesture recognizer may be coupled to a camera or camera array, a microphone or microphone array, a touch screen or touch surface, or a pointing device, or some combination of these items, to detect gestures and commands from the user.

For example, the gesture recognizer may include a touch screen sensor or touch surface, a rear camera, and/or a front camera. Data from the sensors and/or cameras may be fed to hardware, software, firmware or a combination of the same to map the gesture from the user onto the screen or scene to affect a corresponding dynamic behavior of a virtual object. The sensor/camera data may be used to determine momentum and inertia factors to allow a variety of momentum behaviors for a virtual object based on input from the user's hand, such as a swipe rate of a user's finger relative to the scene or a screen. The gesture recognizer may observe eye tracking and other gestures (e.g., with or without additional cameras). Keyboard or button inputs may also be received and recognized by the gesture recognizer or other input interfaces of the prescribed behavior input manager 122.

The screen renderer 123 may draw objects on an AR display for the user to see. The screen renderer 123 may receive data from the virtual object behavior manager 128, described below, and render virtual objects, real objects, displayed objects and any other objects and effects on the appropriate screen or screens. Thus, the data from the virtual object behavior manager 128 would determine the position and dynamics of the virtual objects and associated movements, actions and sounds, for example, and the screen renderer 123 would depict the virtual objects and associated objects and environment on a screen, accordingly.

The communication interface 124 may work with the various computing and display resources in the system 120 to send information regarding virtual objects and effects to other devices so that these can be presented on other displays and to other users. The communication interface 124 may also send audio information so that audio speakers can present aural effects. The communication interface 124 may send parameters for other devices to use in determining displays or it may send completely rendered graphical effects ready for display or some other form of data depending on how computing tasks are distributed.

The communication interface 124 may contain the wired or wireless data interfaces that allow devices in the system to communicate. There may be multiple interfaces with each device. In one example, the AR system 120 may communicate over WiFi to send detailed parameters regarding AR objects. The AR system 120 may also communicate over Bluetooth to send user commands and to receive audio to play through the AR system 120. Any suitable wired or wireless device communication protocols may be used.

The command executor 132 may include a central processing unit to cache and execute commands and to distribute tasks among the other components and interfaces shown as well as to remote systems through a communications interface. The command executor may include an instruction stack, a cache memory to store intermediate and final results, and mass memory to store applications and operating systems. The command executor may also serve as a central coordination and task allocation unit for the system.

The virtual object behavior manager 128 may be to provide behaviors to a virtual object being shown on the display. For example, the input association manager 125 may assign a user's hand movement to a particular virtual object. Thereafter, the gesture recognizer may interpret a user gesture and by mapping the captured movements of a user's hand to recognized movements, and the virtual object tracker 129 may associate the virtual object's position and movements to the movements as recognized by the gesture recognizer. The virtual object behavior manager 128 may generate data that would direct the movements of the virtual object to correspond to the input commands and position.

The virtual object tracker 129 may be to track where a virtual object should be located in the real scene in the vicinity of the display. The virtual object tracker 129 may, for example, track a virtual object as it moves across the scene and track the locations of any real object or additional virtual objects that are near the virtual object. The location information for the virtual object may be combined with information from a video analysis system to aid in the superposition of the AR objects over the real scene. The virtual object tracker 129 may track the actions that should be taken when a video analysis subsystem and the location subsystem 131 determine the detection of various objects and location data.

The AR blender 130 may take the video or still images from a camera that has been analyzed and make the AR objects blend in with the appearance of the background. This may include determining foreground and background positions and rendering lighting, shadowing, reflections, shading and any other effects to enhance the appearance of the AR object.

The location subsystem 131 may use GPS (Global Positioning System), cellular telephone location, mapping software and other systems together with a compass, a barometer, and any other sensors to determine the location of the AR system 120 and the location of the real scene. A video analysis subsystem of the location subsystem 131 may be used to identify objects from an incoming video stream and show the locations of the objects on maps. Distance location mapping may be used for the image input. The video analysis subsystem may, for example, estimate location information for incoming images based on GPS and visual cues in the image frame. This location can be stored for future reference, to provide to other users through the communication interface 124 and for other purposes.

The object generator 133 may provide selections to users and receive the recognized gestures to generate virtual objects and their attributes, including scene-based virtual objects. These attributes may include appearance, size, and initial position. The object generator 133 may be equipped with libraries of different objects and associated attributes from which virtual objects may be created. These objects may be provided to the virtual object behavior manager 128 to generate behaviors and to the virtual object tracker 129 for locations as well as to the rest of the system for all of the described interactions. The attribute manager 136 may assign additional attributes and/or may modify previously assigned attributes.

The gaming manager 134 can be used to provide game play in the context of the AR characters and objects that a user constructs. The game play may include image motion, image size, and angle changes of objects in the image plane or in a three-dimensional space to provide velocity and direction effects for objects in the real scene and to add additional objects to the real scene. The gaming manager 134 may also provide building elements for selection by the user, such as the palettes shown along the side of the display. The gaming manager 134 may also take input from the prescribed behavior input manager 122 to allow different types of inputs to create elements in a building game.

The 3D image interaction and effects manager 135 may generate a three-dimensional space including virtual and real objects and may track virtual object interactions with displayed images and video. The 3D image interaction and effects manager 135 may then allow the objects in the three-dimensional real space to be mapped to the location in the real scene. The influence of objects in the z-axis (e.g., towards and away from the plane of the screen) can be calculated together with the relative influence of these objects upon each other. For example, an object moving about on the real scene may move towards and away from the AR system 120 and be influenced by 3-D objects in the foreground. These objects may change the direction or velocity of an AR object. The object may be rendered in the foreground by the 3D image interaction and effects manager 135 using a 3D presentation technology on the display.

These modules may advantageously allow information from the source content of the scene to be applied to the AR characters with better depth information, thus providing more realistic occlusion and better control of the AR characters in a 3D scene. Also, the virtual object behavior manager 128 may include the aspects of interactive behavior among the AR objects as well. Other command modalities may be recognized, including touch gesture, voice, air gesture, and potentially eye tracking to control AR objects (e.g., as assigned by the input association manager 125).

Non-limiting examples of a computing system suitable for incorporating or implementing the AR apparatuses and systems described herein include a personal computer, a laptop computer, a tablet or slate computer, a gaming console, a media device, a smartphone and/or a portable gaming device.

ADDITIONAL NOTES AND EXAMPLES

Example 1 may include an augmented reality system, comprising a scene capture device to capture an electronic representation of a scene, an object segmenter communicatively coupled to the scene capture device to segment one or more objects in the captured scene, an object recognizer communicatively coupled to the object segmenter to recognize one or more of the segmented objects, an object highlighter communicatively coupled to the object segmenter, the object recognizer, and the input manager to highlight a selected object, selected from the segmented one or more objects and the one or more recognized objects based on an input from a user, a virtual object creator communicatively coupled to the object highlighter to create a scene-based virtual object from the selected object, and a behavior manager communicatively coupled to the virtual object creator to assign an interactive behavior between the scene-based virtual object and a second object in the scene.

Example 2 may include the augmented reality system of Example 1, further comprising an input manager to manage an input from the user, the input manager including at least a first input interface to process a first input modality and a second input interface to process a second input modality different from the first input modality.

Example 3 may include the augmented reality system of Example 2, further comprising an attribute manager communicatively coupled to the virtual object creator to assign an attribute to the scene-based virtual object, and a three dimensional interaction manager to receive depth information from the scene capture device and to manage occlusion effects between the scene-based virtual object and the second object in the scene based on the received depth information.

Example 4 may include a virtual object creation apparatus, comprising an object segmenter to segment one or more objects in a scene, an object highlighter communicatively coupled to the object segmenter to highlight a selected object, selected from the segmented one or more objects based on an input from a user, a virtual object creator communicatively coupled to the object highlighter to create a scene-based virtual object from the selected object, and a behavior manager communicatively coupled to the virtual object creator to assign a behavior to the scene-based virtual object.

Example 5 may include the virtual object creation apparatus of Example 4, wherein the behavior includes an interactive behavior between the scene-based virtual object and a second object in the scene.

Example 6 may include the virtual object creation apparatus of Example 5, further comprising an attribute manager communicatively coupled to the virtual object creator to assign an attribute to the scene-based virtual object.

Example 7 may include the virtual object creation apparatus of Example 6, further comprising a three dimensional interaction manager to receive depth information related to the scene and to manage occlusion effects between the scene-based virtual object and the second object in the scene based on the received depth information.

Example 8 may include the virtual object creation apparatus of any of Examples 5 to 7, wherein the second object in the scene comprises one of a second segmented object in the scene or a second virtual object added to the scene by the user.

Example 9 may include the virtual object creation apparatus of any of Examples 5 to 7, further comprising an input manager to manage an input from the user, the input manager including at least a first input interface to process a first input modality and a second input interface to process a second input modality different from the first input modality, and an input association manager to associate the first input modality with the scene-based virtual object and to associate the second input modality with the second object.

Example 10 may include the virtual object creation apparatus of Example 9, wherein the input association manager is further to manage an association between an input modality and groups of objects in the scene.

Example 11 may include a method of creating a virtual object, comprising segmenting one or more objects in a scene, highlighting a selected object from the segmented one or more objects based on an input from a user, creating a scene-based virtual object from the selected object, and assigning a behavior to the scene-based virtual object.

Example 12 may include the method of Example 11, wherein the behavior includes an interactive behavior between the scene-based virtual object and a second object in the scene.

Example 13 may include the method of Example 12, further comprising assigning an attribute to the scene-based virtual object.

Example 14 may include the method of Example 13, further comprising receiving depth information related to the scene, and managing occlusion effects between the scene-based virtual object and the second object in the scene based on the received depth information.

Example 15 may include the method of any of Examples 12 to 14, wherein the second object in the scene comprises one of a second segmented object in the scene or a second virtual object added to the scene by the user.

Example 16 may include the method of any of Examples 12 to 14, further comprising managing an input from the user, the input including at least a first input modality and a second input modality different from the first input modality, associating the first input modality with the scene-based virtual object, and associating the second input modality with the second object.

Example 17 may include the method of Example 16, further comprising associating an input modality with a group of objects in the scene.

Example 18 may include at least one computer readable storage medium comprising a set of instructions, which when executed by a computing device, cause the computing device to segment one or more objects in a scene, highlight a selected object from the segmented one or more objects based on an input from a user, create a scene-based virtual object from the selected object, and assign a behavior to the scene-based virtual object.

Example 19 may include the at least one computer readable storage medium of Example 18, wherein the behavior includes an interactive behavior between the scene-based virtual object and a second object in the scene.

Example 20 may include the at least one computer readable storage medium of Example 19, comprising a further set of instructions, which when executed by a computing device, cause the computing device to assign an attribute to the scene-based virtual object.

Example 21 may include the at least one computer readable storage medium of Example 20, comprising a further set of instructions, which when executed by a computing device, cause the computing device to receive depth information related to the scene, and manage occlusion effects between the scene-based virtual object and the second object in the scene based on the received depth information.

Example 22 may include the at least one computer readable storage medium of any of Examples 19 to 21, wherein the second object in the scene comprises one of a second segmented object in the scene or a second virtual object added to the scene by the user.

Example 23 may include the at least one computer readable storage medium of any of Examples 19 to 21, comprising a further set of instructions, which when executed by a computing device, cause the computing device to manage an input from the user, the input including at least a first input modality and a second input modality different from the first input modality associate the first input modality with the scene-based virtual object, and associate the second input modality with the second object.

Example 24 may include the at least one computer readable storage medium of Example 23, comprising a further set of instructions, which when executed by a computing device, cause the computing device to associate an input modality with a group of objects in the scene.

Example 25 may include a virtual objection creation apparatus, comprising means for segmenting one or more objects in a scene, means for highlighting a selected object from the segmented one or more objects based on an input from a user, means for creating a scene-based virtual object from the selected object, and means for assigning a behavior to the scene-based virtual object.

Example 26 may include the virtual objection creation apparatus of Example 25, wherein the behavior includes an interactive behavior between the scene-based virtual object and a second object in the scene.

Example 27 may include the virtual objection creation apparatus of Example 26, further comprising means for assigning an attribute to the scene-based virtual object.

Example 28 may include the virtual objection creation apparatus of Example 27, further comprising means for receiving depth information related to the scene, and means for managing occlusion effects between the scene-based virtual object and the second object in the scene based on the received depth information.

Example 29 may include the virtual objection creation apparatus of any of Examples 26 to 28, wherein the second object in the scene comprises one of a second segmented object in the scene or a second virtual object added to the scene by the user.

Example 30 may include the virtual objection creation apparatus of any of Examples 26 to 28, further comprising means for managing an input from the user, the input including at least a first input modality and a second input modality different from the first input modality means for associating the first input modality with the scene-based virtual object, and means for associating the second input modality with the second object.

Example 31 may include the virtual objection creation apparatus of Example 30, further comprising means for associating an input modality with a group of objects in the scene.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An augmented reality system, comprising:
    a scene capture device, implemented at least partly in one or more of configurable logic or fixed-functionality logic hardware, to capture an electronic representation of a scene;
    an object segmenter, implemented at least partly in one or more of configurable logic or fixed-functionality logic hardware, communicatively coupled to the scene capture device to segment one or more objects in the captured scene;
    an object recognizer, implemented at least partly in one or more of configurable logic or fixed-functionality logic hardware, communicatively coupled to the object segmenter to recognize one or more of the segmented one or more objects;
    an input manager, implemented at least partly in one or more of configurable logic or fixed-functionality logic hardware, to manage an input from a user, wherein the input manager includes at least a first input interface to process a first input modality and a second input interface to process a second input modality different from the first input modality;
    an object highlighter, implemented at least partly in one or more of configurable logic or fixed-functionality logic hardware, communicatively coupled to the object segmenter, the object recognizer, and the input manager to highlight a selected object, selected from the segmented one or more objects and the one or more recognized objects based on the input from the user;
    a virtual object creator, implemented at least partly in one or more of configurable logic or fixed-functionality logic hardware, communicatively coupled to the object highlighter to create a scene-based virtual object from the selected object;
    a behavior manager, implemented at least partly in one or more of configurable logic or fixed-functionality logic hardware, communicatively coupled to the virtual object creator to assign an interactive behavior between the scene-based virtual object and a second object in the scene; and
    an input association manager, implemented at least partly in one or more of configurable logic or fixed-functionality logic hardware, to associate the first input modality with the scene-based virtual object so that the scene-based virtual object is to be controlled through the first input modality but not the second input modality, and to associate the second input modality with the second object so that the second object is to be controlled through the second input modality but not the first input modality.

2. The augmented reality system of claim 1, further comprising:
    an attribute manager, implemented at least partly in one or more of configurable logic or fixed-functionality logic hardware, communicatively coupled to the virtual object creator to assign an attribute to the scene-based virtual object; and
    a three dimensional interaction manager, implemented at least partly in one or more of configurable logic or fixed-functionality logic hardware, to receive depth information from the scene capture device and to manage occlusion effects between the scene-based virtual object and the second object in the scene based on the received depth information.

3. A virtual object creation apparatus, comprising:
    an object segmenter, implemented at least partly in one or more of configurable logic or fixed-functionality logic hardware, to segment one or more objects in a scene;

an object highlighter, implemented at least partly in one or more of configurable logic or fixed-functionality logic hardware, communicatively coupled to the object segmenter to highlight a selected object, selected from the segmented one or more objects based on an input from a user;

a virtual object creator, implemented at least partly in one or more of configurable logic or fixed-functionality logic hardware, communicatively coupled to the object highlighter to create a scene-based virtual object from the selected object;

a behavior manager, implemented at least partly in one or more of configurable logic or fixed-functionality logic hardware, communicatively coupled to the virtual object creator to assign a selected behavior to the scene-based virtual object;

an input manager, implemented at least partly in one or more of configurable logic or fixed-functionality logic hardware, to manage an input from the user, the input manager including at least a first input interface to process a first input modality and a second input interface to process a second input modality different from the first input modality; and an input association manager, implemented at least partly in one or more of configurable logic or fixed-functionality logic hardware, to associate the first input modality with the scene-based virtual object so that the scene-based virtual object is to be controlled through the first input modality but not the second input modality, and to associate the second input modality with a second object in the scene so that the second object is to be controlled through the second input modality but not the first input modality.

4. The virtual object creation apparatus of claim 3, wherein the selected behavior includes an interactive behavior between the scene-based virtual object and the second object.

5. The virtual object creation apparatus of claim 4, further comprising:
an attribute manager, implemented at least partly in one or more of configurable logic or fixed-functionality logic hardware, communicatively coupled to the virtual object creator to assign an attribute to the scene-based virtual object.

6. The virtual object creation apparatus of claim 5, further comprising:
a three dimensional interaction manager, implemented at least partly in one or more of configurable logic or fixed-functionality logic hardware, to receive depth information related to the scene and to manage occlusion effects between the scene-based virtual object and the second object in the scene based on the received depth information.

7. The virtual object creation apparatus of claim 4, wherein:
the scene-based virtual object is a virtual version of the selected object; and
the second object in the scene comprises one of a second segmented object in the scene or a second virtual object added to the scene by the user.

8. The virtual object creation apparatus of claim 3, wherein the input association manager is further to manage an association between an input modality and groups of objects in the scene.

9. A method of creating a virtual object, comprising:
segmenting one or more objects in a scene;
highlighting a selected object from the segmented one or more objects based on an input from a user;
creating a scene-based virtual object from the selected object;
assigning a selected behavior to the scene-based virtual object;
managing another input from the user, the another input including at least a first input modality and a second input modality different from the first input modality;
associating the first input modality with the scene-based virtual object so that the scene-based virtual object is controlled through the first input modality but not the second input modality; and
associating the second input modality with a second object in the scene so that the second object is controlled through the second input modality but not the first input modality.

10. The method of claim 9, wherein the selected behavior includes an interactive behavior between the scene-based virtual object and the second object.

11. The method of claim 10, further comprising:
assigning an attribute to the scene-based virtual object.

12. The method of claim 11, further comprising:
receiving depth information related to the scene; and
managing occlusion effects between the scene-based virtual object and the second object in the scene based on the received depth information.

13. The method of claim 10, wherein:
the scene-based virtual object is a virtual version of the selected object; and
the second object in the scene comprises one of a second segmented object in the scene or a second virtual object added to the scene by the user.

14. The method of claim 9, further comprising:
associating an input modality with a group of objects in the scene.

15. At least one non-transitory computer readable storage medium comprising a set of instructions, which when executed by a computing device, cause the computing device to:
segment one or more objects in a scene;
highlight a selected object from the segmented one or more objects based on an input from a user;
create a scene-based virtual object from the selected object;
assign a selected behavior to the scene-based virtual object;
manage another input from the user, the another input including at least a first input modality and a second input modality different from the first input modality;
associate the first input modality with the scene-based virtual object so that the scene-based virtual object is to be controlled through the first input modality but not the second input modality; and
associate the second input modality with a second object in the scene so that the second object is to be controlled through the second input modality but not the first input modality.

16. The at least one non-transitory computer readable storage medium of claim 15, wherein the selected behavior includes an interactive behavior between the scene-based virtual object and the second object.

17. The at least one non-transitory computer readable storage medium of claim 16, comprising a further set of instructions, which when executed by a computing device, cause the computing device to:

assign an attribute to the scene-based virtual object.

18. The at least one non-transitory computer readable storage medium of claim 17, comprising a further set of instructions, which when executed by a computing device, cause the computing device to:

receive depth information related to the scene; and manage occlusion effects between the scene-based virtual object and the second object in the scene based on the received depth information.

19. The at least one non-transitory computer readable storage medium of claim 16, wherein:

the scene-based virtual object is a virtual version of the selected object; and the second object in the scene comprises one of a second segmented object in the scene or a second virtual object added to the scene by the user.

20. The at least one non-transitory computer readable storage medium of claim 15, comprising a further set of instructions, which when executed by a computing device, cause the computing device to:

associate an input modality with a group of objects in the scene.

\* \* \* \* \*